3 Sheets—Sheet 1.

W. J. CLAPP & T. GRIFFITHS,

Assignors to J. P. WITHEROW and H. W. OLIVER, JR.

CUPOLA FURNACE.

No. 10,481. Reissued May 20, 1884.

Witnesses:
N. B. Comin
J. K. Smith

Inventor:
William J. Clapp
Thomas Griffiths
by their Attys
B. & Lovell & Kerr

3 Sheets—Sheet 2.

W. J. CLAPP & T. GRIFFITHS,

Assignors to J. P. WITHEROW and H. W. OLIVER, JR.

CUPOLA FURNACE.

No. 10,481.

Reissued May 20, 1884.

Witnesses:

W. B. Conover

J. K. Smith

Inventor:

William J. Clapp

Thomas Griffiths by their Attys

Bakewell & Kerr

W. J. CLAPP & T. GRIFFITHS, 3 Sheets—Sheet 3.

Assignors to J. P. WITHEROW and H. W. OLIVER, JR.

CUPOLA FURNACE.

No. 10,481. Reissued May 20, 1884.

Witnesses:
M. B. Comin
J. K. Smith

Inventor:
William J. Clapp
Thomas Griffiths
by their Attys
Bakewell & Kerr

UNITED STATES PATENT OFFICE.

WILLIAM JOHN CLAPP, OF NANTYGLO, AND THOMAS GRIFFITHS, OF BLAENAVON, COUNTY OF MONMOUTH, ENGLAND, ASSIGNORS TO JAMES PORTER WITHEROW AND HENRY WM. OLIVER, JR., BOTH OF PITTSBURG, PENNSYLVANIA.

CUPOLA-FURNACE.

SPECIFICATION forming part of Reissued Letters Patent No. 10,481, dated May 20, 1884.

Original No. 271,683, dated February 6, 1883; Reissue No. 10,432, dated January 1, 1884. Application for reissue filed April 15, 1884. Patented in England March 28, 1881, No. 1,372; in France September 27, 1881, No. 145,039; in Belgium September 27, 1881, No. 55,846; in Germany September 27, 1881, No. 18,250; in Austria September 27, 1881, and in Spain October 1, 1881.

*To all whom it may concern:*

Be it known that we, WILLIAM JOHN CLAPP and THOMAS GRIFFITHS, subjects of the Queen of Great Britain, residing, respectively, at Nantyglo and Blaenavon, in the county of Monmouth, England, have invented a new and useful Improvement in Cupola-Furnaces; and we do hereby declare the following to be a full, clear, and exact description thereof.

The invention has for its object improvements in means or apparatus employed in the manufacture of iron and steel. For this purpose we dispense with the costly converters now in use and obviate the danger incurred in pouring metal therefrom, together with the risk of the metal running back into the tuyeres, while by our invention we obtain facility of manipulation, an effective treatment of the metal, a cheaply-constructed apparatus, and less waste than that incurred by the use of the ordinary converter.

In order that our said invention may be clearly understood and readily carried into effect, we will proceed, aided by the accompanying drawings, fully to describe the same.

Figure 1:
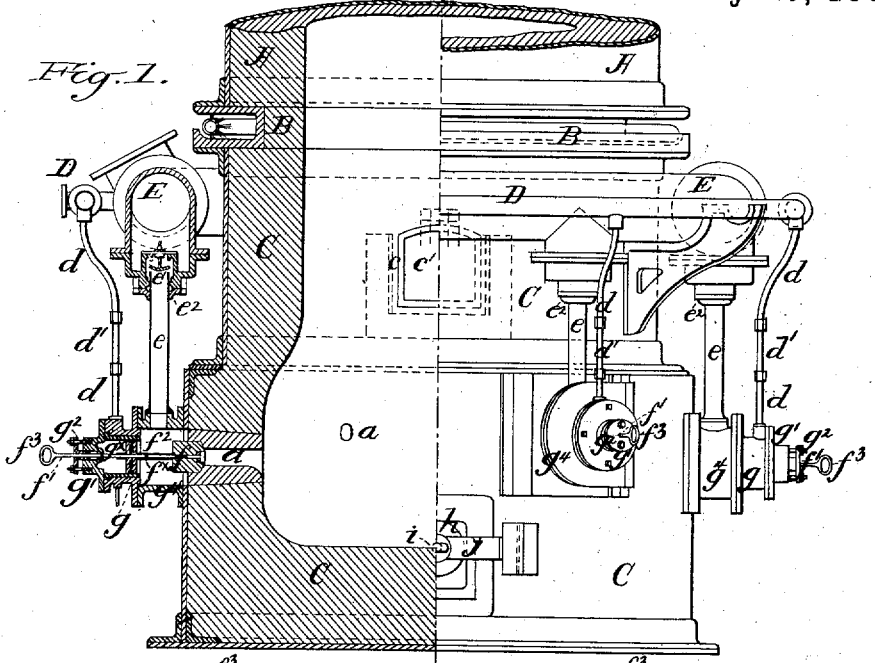
Figure 2:
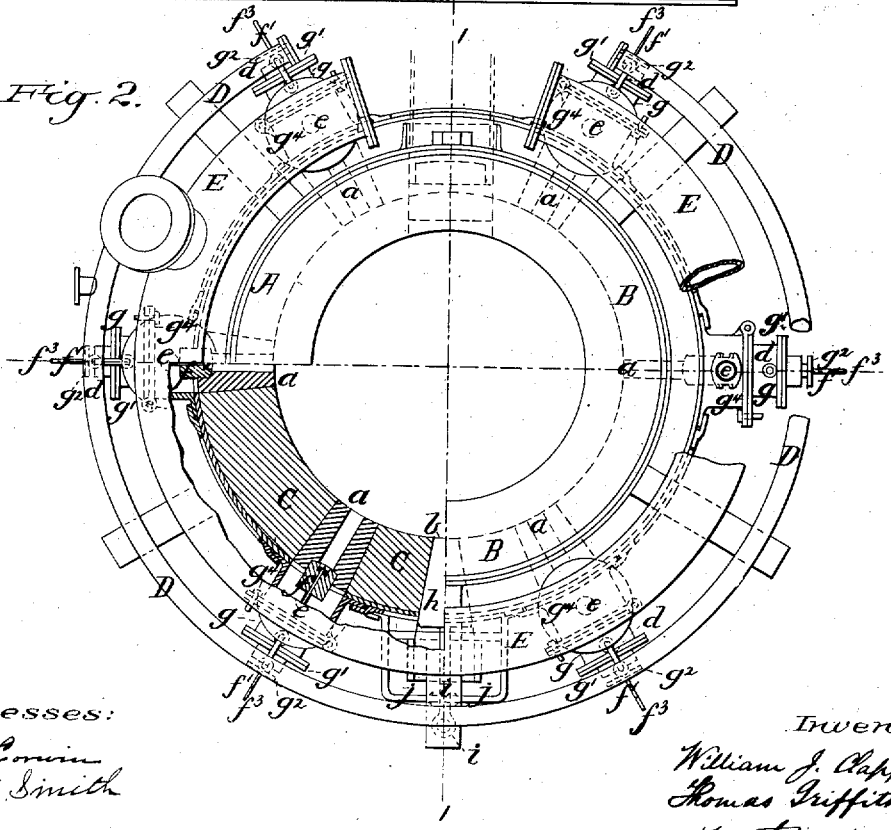
Figure 3:
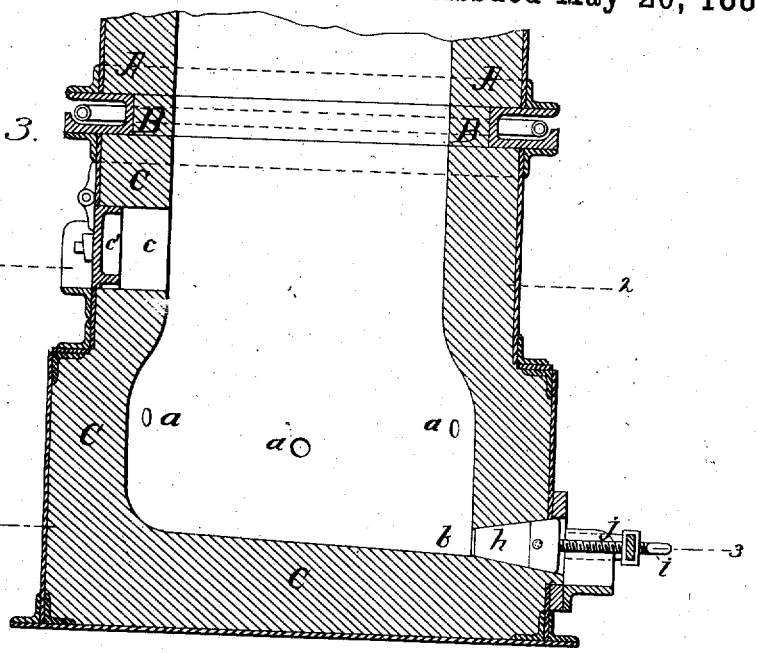
Figure 5:
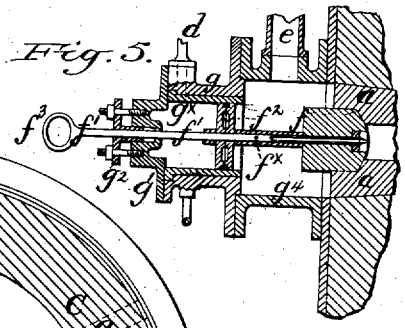
Figure 4:
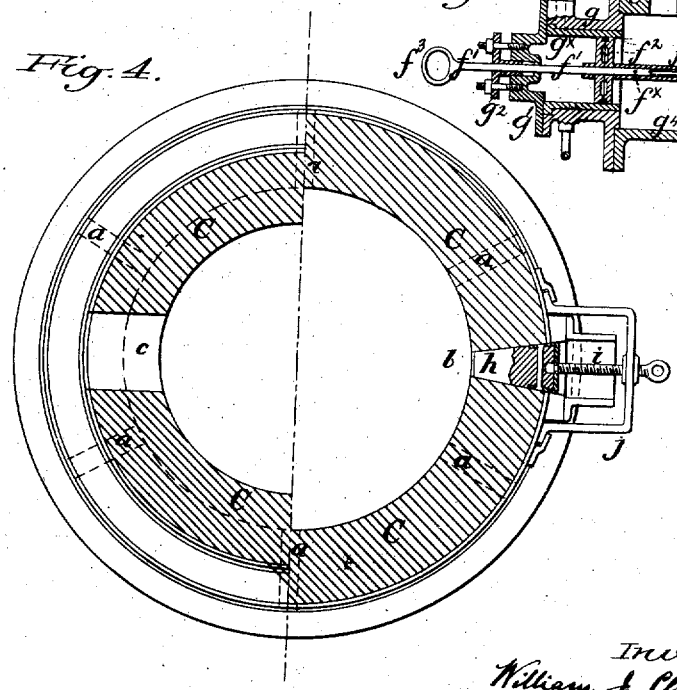
Figure 6:
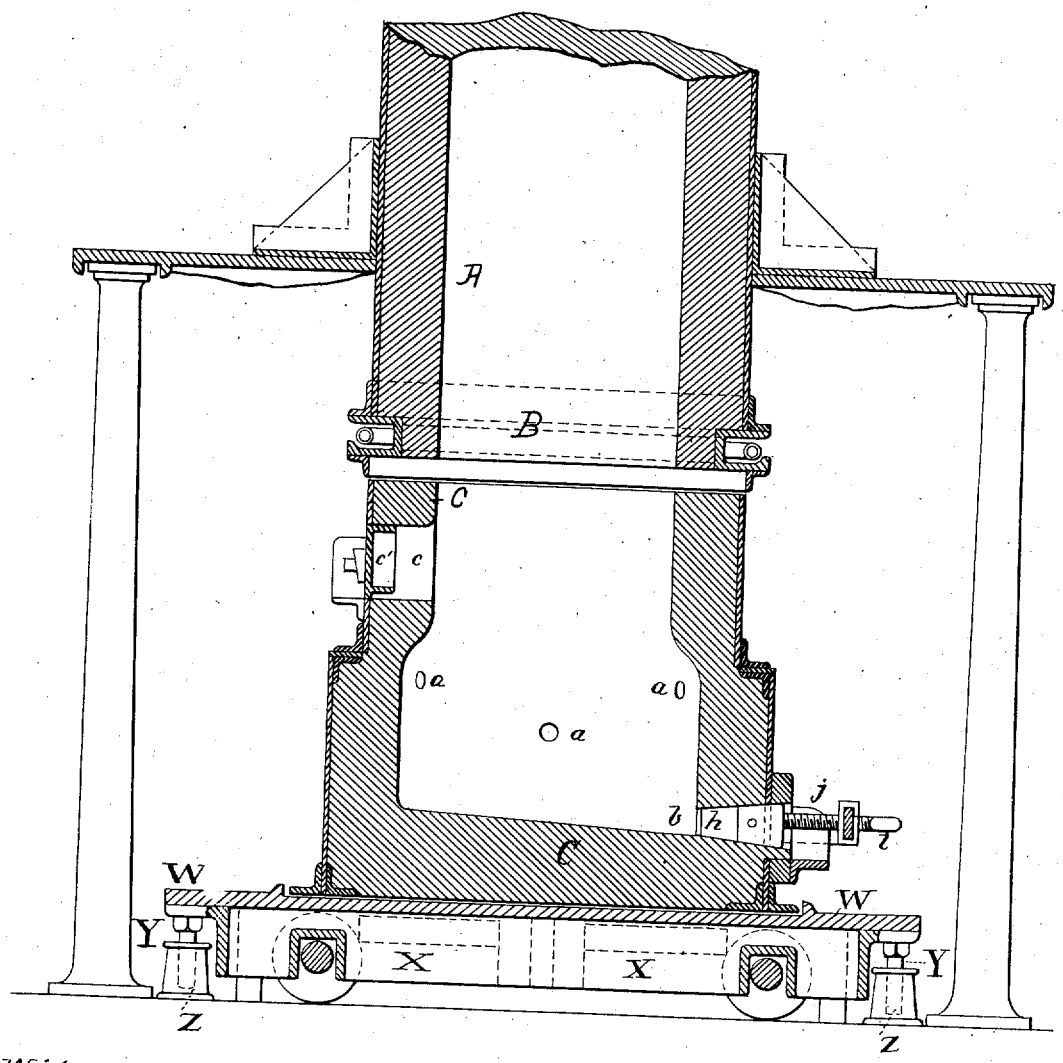

In the drawings, Figure 1 represents an elevation, partly in vertical section, of an upright converter constructed according to our invention. Fig. 2 represents partly a plan and partly a horizontal section. Fig. 3 represents a vertical section drawn on the line 1 1 of Fig. 2. Fig. 4 represents horizontal sections drawn on the lines 2 2 and 3 3 of Fig. 3. Fig. 5 represents a section of parts drawn on a larger scale. Fig. 6 represents a vertical section of the apparatus, showing the carriage for supporting and transporting the lower section of the apparatus.

In all the figures like parts are marked with similar letters of reference.

In carrying our invention into effect we employ an upright furnace formed in three parts, A B C, the upper one, A, forming the stack, and being supported on fixed pillars, or on a fixed framing, (not shown,) the intermediate part, B, forming a bosh or chamber for the circulation of water therein. The steam and blast pipes D E are permanently fixed in position, while the lower part, C, which is to receive the fluid or molten metal to be treated, is mounted upon a frame, W, capable of being raised and lowered upon another frame, X, provided with wheels to run on a railway, as will be readily understood. Screws Y, moving in floor-posts Z, are generally employed for raising and lowering the frame W and the lower section of the furnace, as shown in Fig. 6. The lower part of the furnace is provided with tuyeres *a*, fixed in the side thereof, and with a tap-hole, *b*, at the bottom, to permit the metal, after treatment, being run out therefrom. Another aperture, *c*, fitted with a door, *c'*, is also provided above the level of the fluid metal, which serves as a charging-aperture, and also to permit the slag and other impurities to be raked off the top of the fluid or molten metal and removed from the converter. Each tuyere *a* is provided at its rear end with a seat for a plug or stopper, *f*, to enable the blast to be shut off when required, and such plug or stopper *f* is fixed to a rod, *f'*, provided with a disk or piston, $f^2$, fitting a steam tube or cylinder, *g*, so as to enable the steam, when admitted to the back of the piston $f^2$, to press the stopper *f* to its seat; and in order to enable the said stopper *f* to be drawn back from its seat when from any cause the pressure of the blast against the piston $f^2$ is unable to remove it, we carry the rod *f'* through a stuffing-box, $g^2$, and provide the end thereof with a handle, $f^3$, by which it can be readily pulled away from its seat when required.

The steam tube or cylinder *g* is formed of a bored tube or bush, $g^x$, fixed in the outer cylinder or box, *g*, which latter is provided with a cover, *g'*, and steam-pipe *d*, and is attached to a box, $g^4$, to which latter is connected an air-blast pipe, *e*, provided with a valve, *e'*, capable of being closed against the air-blast when from any cause it is desired to shut off the ction of one of the tuyeres, in which case the tube $e$, connected with such tuyere, is removed from the apparatus, and a block of wood or metal placed in position to press the valve $e'$ to its seat.

We are, by the means above described, enabled to send a blast of air into the metal in the furnace-section C, and to shut it off simultaneously from all the tuyeres, as may be required. When the stopper $f$ is pressed against its seat at the rear end of the tuyere $a$ by the steam acting on the back of the piston $f^2$, the fluid or molten metal is prevented from running back through the tuyere, while when the steam is shut off from the back of the piston $f^2$ and compressed air is admitted to the box $g^4$, the pressure of the air acts against the front of the piston $f^2$ in the contrary direction to that of the steam, and thereby removes the plug or stopper $f$ from its seat, thus enabling the air-blast to enter the tuyere $a$.

In the drawings we have represented the rod $f'$ as being formed of a tube with an opening, $f^\times$, to the box $g^4$, and we have also represented the plug $f$ as being formed with a small aperture at the center thereof. This construction is to enable a small blast of air to enter the tuyere $a$ when the plug or stopper is forced to its seat, thereby preventing the metal cooling within the tuyere $a$, such small blast having no injurious effect on the fluid or molten metal during the short period of its action.

The middle part, B, of the apparatus, having a supply of water, is intended to keep the upper portion or stack, A, comparatively cool; and such part B may be flush on its inner surface with that of either the upper or lower portion of the apparatus, or with both, as shown at Figs. 1, 2, 3, 4; or it may be caused to project somewhat into the interior of the apparatus, in which case it will serve as a ledge to catch the slag and other solid impurities boiling up out of the fluid or molten metal.

The lower part, C, being mounted on a frame capable of being raised and lowered, as before described, can be raised into position under the upper parts, A B, and lowered away therefrom and removed, and by being fitted to run on rails it may be readily conveyed to the mills, or to other desired position, and to the repairing and drying shed when required; and in order to facilitate such adjustment in position for use and removal of the lower part, C, we cause the air-blast tube $c$ to fit and slide in and out through stuffing-boxes $c^2$, attached to the tube E; and we form the steam-tubes $d$ with flexible parts $d'$, capable of being connected and disconnected with the other part or parts by means of union-joints, as will be readily understood.

Instead of forming the movable lower part, C, of the apparatus to fit closely up against the middle part, B, it may be formed and arranged to rise up concentrically a short distance within the upper portion or stack, A, and to leave an annular space between the two, as will be readily understood, by which means the necessity for closely fitting the parts is avoided, and the slag and other solid impurities boiling up from the fluid or molten metal are discharged over the edge of the vessel C, and fall down through the space between the two parts, a suitable aperture, $c$, fitted with a door, $c'$, being provided, as before described, above the level of the fluid or molten metal, to serve as a charging-aperture, and to enable the slag on the surface of the fluid or molten metal to be scraped off.

At $h$ in Figs. 3 and 4 is shown a tapping plug or stopper and a mode of working the same by means of a screw, $i$, working through a yoke, $j$.

The apparatus herein described may be employed in the manufacture of steel and homogeneous metal, or in treating fluid molten metal for other purposes.

It is admitted that hydrocarbon-burners having concentric pipes and nozzles capable of axial adjustment to regulate the relative volumes of air, steam, and oil, and to shut off the flow of either at will, are old. It is also admitted that tuyeres placed above the level of the bed of a furnace, for supplying two or more gases thereto through interposed flues, are old, such tuyeres being so constructed that the parts are capable of relative adjustment to regulate the relative volumes of the gases or to shut off the flow of either at will. It is also admitted that a cupola melting-furnace having blast-box and tuyeres and slides placed in the box for regulating the admission of air to the tuyeres, has been devised; but such furnace is not for treating molten metal, the slides are not capable of acting as stoppers to prevent the flow of molten metal through the tuyeres, and the tuyeres are arranged above the cinder-tap. It is also admitted that it has heretofore been suggested to introduce dephosphorizing agents into a furnace laterally by tuyeres, or by narrow oblong and horizontal slits, and that the outlets of such tuyeres or conduits may be narrowed or widened by conical or cuneiform stoppers or mouth-pieces. It is also admitted that a Bessemer converter has been provided with an outside receiver for containing carbonaceous matter, which receiver communicated with the converter by an opening provided with a solid plug at its outer end capable of being opened by a screw-stem to admit the molten metal to the receiver, so that the carbonaceous matter might be ignited and generate gases. We do not claim such construction, for the reason that it is an ordinary tipping converter, provided with a wind-box and ordinary pneumatic tuyeres without stoppers, and is not capable for use for the purpose and in the manner that our converter is used.

Having thus described the nature of our said invention, and the mode in which we carry the same into effect, we would have it understood that what we claim is—

1. In a cupola-furnace, the combination of a bottom section or vessel having a tuyere-opening and external blast and steam chambers, and a plug provided with a stem and a piston fitted in said chambers, with a pipe for admitting steam in rear of the piston for forcing the plug into the tuyere-opening, and an air-blast pipe leading into the chamber in front of said piston, for removing the plug from the tuyere-opening and admitting air through the latter into the bottom section of the furnace, substantially as and for the purposes described.

2. The combination of the vessel C, having the tuyeres *a*, external air-chamber, $g^4$, and vertical pipes *e* leading into said chamber, and the stationary air-pipe E, having bottom openings for the reception of the pipes *e*, and valves for closing said openings, with the shaft of the furnace, and means for elevating and transporting the vessel C, as and for the purpose set forth.

3. The combination of the vessel C, having tuyeres *a* through its sides, external air-chamber, $g^4$, attached to the vessel, stopper *f*, and hollow stem *f'*, communicating with both air-chamber and tuyere when the tuyere is closed by the stopper, substantially as and for the purposes described.

4. A cupola-furnace or converter having a removable lower section or crucible, tuyeres in said lower section below the metal-line, a blast-pipe, detachable connections between said blast-pipe and tuyeres, and means for simultaneously closing the tuyeres against the passage of the metal therethrough, substantially as and for the purposes described.

5. A cupola-furnace or converter having a removable lower section or crucible provided with tuyeres in its sides, a blast-pipe supported on the fixed section of the converter, detachable connections between said blast-pipe and tuyeres, and means for closing the openings of the blast-pipe when the connections are removed, substantially as and for the purposes described.

6. A cupola-furnace or converter having tuyeres fixed in its sides below the metal-line, a blast-pipe, and external air-chambers fixed to its sides, with which the tuyeres communicate and from which they receive the blast, in combination with plugs, stoppers or valves situate in said chambers, and means for simultaneously operating the stoppers from the outside to open or close the tuyeres at pleasure, substantially as and for the purposes described.

7. A cupola-furnace or converter having a tuyere or tuyeres, and an external air chamber or chambers with which the tuyere communicates and from which it receives the blast, in combination with a plug, stopper, or valve to close the tuyere to prevent the escape of the molten metal therethrough, means for operating the stopper, and a passage for admitting a small stream of air through the tuyere when the stopper is closed, substantially as and for the purposes described.

8. The combination of a fixed converter or cupola-furnace for treating molten metal, having all of its pneumatic tuyeres provided with plugs, stoppers, or valves, and organized means for seating and unseating said plugs, stoppers, or valves simultaneously during the operation of the converter, substantially as described.

In testimony whereof we have hereunto set our hands this 25th day of February, A. D. 1884.

WILLIAM JOHN CLAPP.
THOMAS GRIFFITHS.

Witnesses:
GEO. GEEN,
2 *Iva Villas, Newport, Monmouth, Engineer.*
HRY. CREASE,
*Conway Villa, Caeran, Newport, Monmouth, Solr. Clerk.*